(12) United States Patent
Sun et al.

(10) Patent No.: US 12,495,447 B2
(45) Date of Patent: *Dec. 9, 2025

(54) USER EQUIPMENT FIXED FRAME PERIOD FOR FRAME BASED EQUIPMENT MODE IN UNLICENSED SPECTRUM

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Aleksandar Damnjanovic, Del Mar, CA (US); Juan Montojo, San Diego, CA (US); Rajat Prakash, San Diego, CA (US); Andrei Dragos Radulescu, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,341

(22) Filed: Apr. 20, 2023

(65) Prior Publication Data

US 2023/0379968 A1 Nov. 23, 2023

Related U.S. Application Data

(63) Continuation of application No. 17/302,006, filed on Apr. 21, 2021, now Pat. No. 11,665,739.

(Continued)

(51) Int. Cl.
*H04W 74/0816* (2024.01)
*H04W 72/1263* (2023.01)
*H04W 74/00* (2009.01)

(52) U.S. Cl.
CPC ... *H04W 74/0816* (2013.01); *H04W 72/1263* (2013.01); *H04W 74/002* (2013.01)

(58) Field of Classification Search
CPC ......... H04W 74/0816; H04W 72/1263; H04W 74/008; H04W 16/14
See application file for complete search history.

(56) References Cited

U.S. PATENT DOCUMENTS

2018/0167941 A1 6/2018 Zhang et al.
2019/0335456 A1* 10/2019 Yerramalli ........ H04W 74/0808
(Continued)

OTHER PUBLICATIONS

International Search Report and Written Opinion—PCT/US2021/071054—ISA/EPO—Nov. 24, 2021.
(Continued)

*Primary Examiner* — Ricky Q Ngo
*Assistant Examiner* — Kabir U Jahangir
(74) *Attorney, Agent, or Firm* — Harrity & Harrity, LLP

(57) ABSTRACT

Various aspects of the present disclosure generally relate to wireless communication. In some aspects, a user equipment (UE) may determine a fixed frame period (FFP) configured for the UE in a frame based equipment mode. The FFP configured for the UE includes one or more idle periods and a channel occupancy time that is offset from an FFP configured for a base station communicating with the UE over an unlicensed channel. The UE may refrain from transmitting over the unlicensed channel during the one or more idle periods. The one or more idle periods may at least partially overlap with a time period in which the base station refrains from transmitting over the unlicensed channel. Numerous other aspects are provided.

29 Claims, 13 Drawing Sheets

Related U.S. Application Data

(60) Provisional application No. 62/706,179, filed on Aug. 4, 2020.

(56) References Cited

U.S. PATENT DOCUMENTS

| | | | |
|---|---|---|---|
| 2020/0037354 A1 | 1/2020 | Li et al. | |
| 2020/0314891 A1 | 10/2020 | Li et al. | |
| 2021/0084683 A1 | 3/2021 | Li et al. | |
| 2021/0195643 A1 | 6/2021 | Talarico et al. | |
| 2021/0385863 A1 | 12/2021 | Fan et al. | |
| 2022/0039151 A1 | 2/2022 | Li et al. | |
| 2022/0046708 A1 | 2/2022 | Sun et al. | |
| 2022/0248466 A1* | 8/2022 | Fan | H04W 72/54 |
| 2022/0386371 A1* | 12/2022 | Jiang | H04W 74/0808 |
| 2023/0199833 A1* | 6/2023 | Xu | H04W 74/0808 370/329 |
| 2023/0239917 A1* | 7/2023 | Karaki | H04W 74/02 370/329 |
| 2023/0319885 A1* | 10/2023 | Bagheri | H04L 1/1819 370/329 |
| 2023/0389071 A1* | 11/2023 | Li | H04W 16/14 |
| 2024/0098781 A1* | 3/2024 | Tsai | H04W 74/0808 |

OTHER PUBLICATIONS

Samsung: "Channel Access Procedures for NR-U", 3GPP TSG-RAN WG1 Meeting #98bis, R1-1910459—Channel Access Procedures for NR-U, 3rd Generation Partnership Project, Mobile Competence Centre, 650, Route Des Lucioles, F-06921 Sophia-Antipolis Cedex, France, vol. Chongqing, China, Oct. 14, 2019-201910207, Oct. 2019 (Oct. 7, 2019), pp. 1-12, XP051809122, pp. 6-7, 6 UE to gNB COT sharing, pp. 7-8, 7 Channel Access for FBE-based NR-U, pp. 8-9, 9 LBT with Handshake Mechanism for NR-U.

VIVO: "Discussion on the Channel Access Procedures", 3GPP TSG RAN WG1#98bis, 3GPP Draft, R1-1910204, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14-20, 2019, Oct. 4, 2019 (Oct. 4, 2019), 10 Pages, XP051808107, The whole document, Section 2.1, 2.6.

* cited by examiner

USER EQUIPMENT FIXED FRAME PERIOD FOR FRAME BASED EQUIPMENT MODE IN UNLICENSED SPECTRUM

CROSS-REFERENCE TO RELATED APPLICATION

The present Application is a continuation and claims the benefit of U.S. patent Non-Provisional application Ser. No. 17/302,006, entitled "USER EQUIPMENT FIXED FRAME PERIOD FOR FRAME BASED EQUIPMENT MODE IN UNLICENSED SPECTRUM, filed on Apr. 21, 2021, which claims benefit of U.S. Provisional Patent Application No. 62/706,179, filed on Aug. 4, 2020, entitled "USER EQUIPMENT FIXED FRAME PERIOD FOR FRAME BASED EQUIPMENT MODE IN UNLICENSED SPECTRUM," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for providing a user equipment (UE) fixed frame period (FFP) for frame based equipment (FBE) mode in unlicensed spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining a fixed frame period (FFP) configured for the UE in a frame based equipment (FBE) mode, wherein the FFP configured for the UE includes one or more idle periods and a channel occupancy time that is offset from an FFP configured for a base station communicating with the UE over an unlicensed channel; and refraining from transmitting over the unlicensed channel during the one or more idle periods, wherein the one or more idle periods at least partially overlap with a time period in which the base station refrains from transmitting over the unlicensed channel.

In some aspects, a UE for wireless communication includes: a memory; and one or more processors operatively coupled to the memory, the memory and the one or more processors configured to: determine an FFP configured for the UE in an FBE mode, wherein the FFP configured for the UE includes one or more idle periods and a channel occupancy time that is offset from an FFP configured for a base station communicating with the UE over an unlicensed channel; and refrain from transmitting over the unlicensed channel during the one or more idle periods, wherein the one or more idle periods at least partially overlap with a time period in which the base station refrains from transmitting over the unlicensed channel.

In some aspects, a non-transitory computer-readable medium storing a set of instructions for wireless communication includes: one or more instructions that, when executed by one or more processors of a UE, cause the UE to: determine an FFP configured for the UE in an FBE mode, wherein the FFP configured for the UE includes one or more idle periods and a channel occupancy time that is offset from an FFP configured for a base station communicating with the UE over an unlicensed channel; and refrain from transmitting over the unlicensed channel during the one or more idle periods, wherein the one or more idle periods at least partially overlap with a time period in which the base station refrains from transmitting over the unlicensed channel.

In some aspects, an apparatus for wireless communication includes: means for determining an FFP configured for the apparatus in an FBE mode, wherein the FFP configured for the apparatus includes one or more idle periods and a channel occupancy time that is offset from an FFP configured for a base station communicating with the apparatus over an unlicensed channel; and means for refraining from transmitting over the unlicensed channel during the one or more idle periods, wherein the one or more idle periods at least partially overlap with a time period in which the base station refrains from transmitting over the unlicensed channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
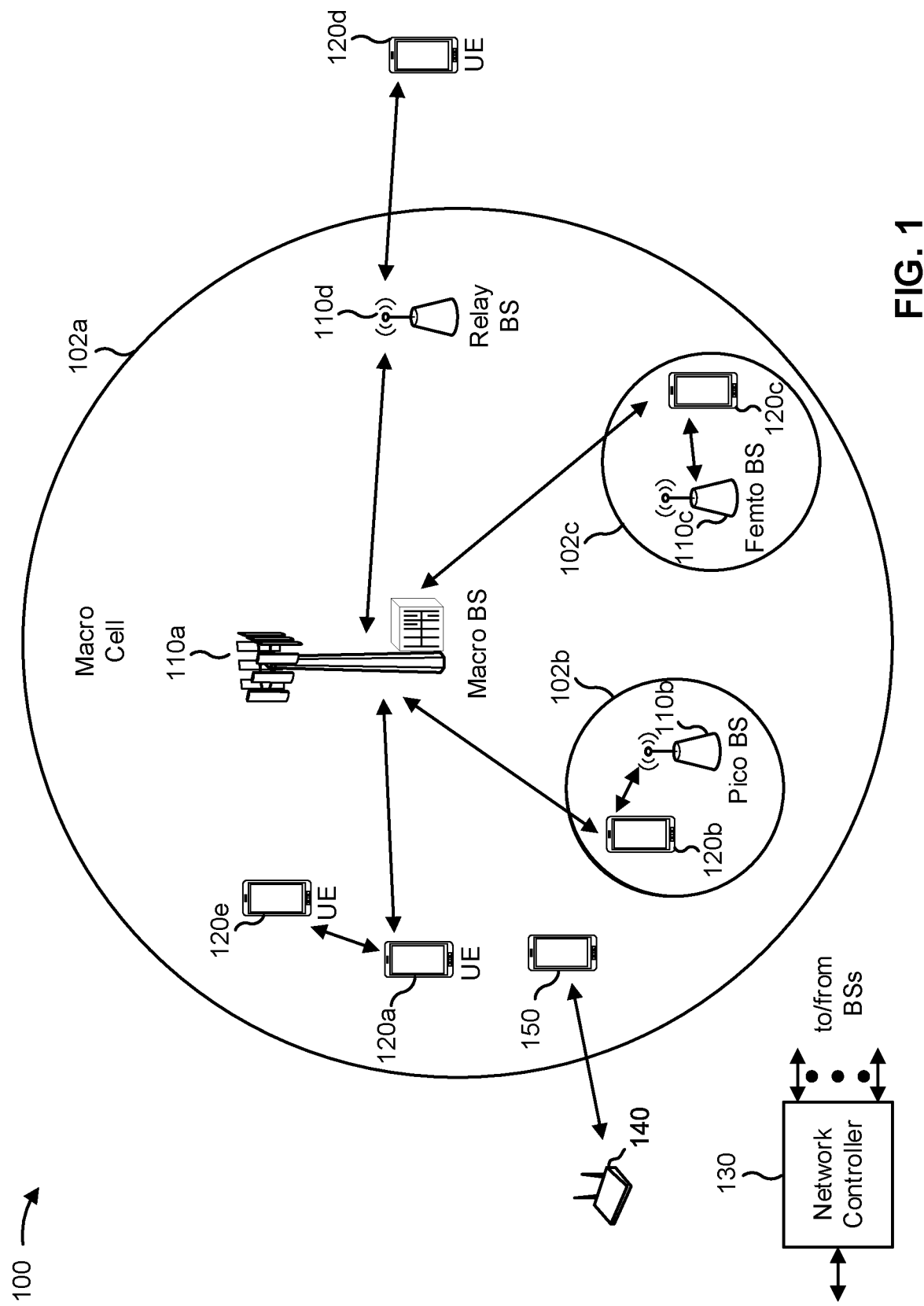
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Additionally, or alternatively, the wireless network 100 may include one or more WLAN access points 140 and one or more WLAN stations 150. With reference to the WLAN of the wireless network 100, the WLAN access points 140 may wirelessly communicate with the WLAN stations 150 via one or more WLAN access point antennas, over one or more communication links. In some aspects, a WLAN access point 140 may communicate with a WLAN station 150 using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac). In some aspects, a WLAN access point 140 and a base station 110 may be the same device or may be co-located. Additionally, or alternatively, a WLAN station 150 and a UE 120 may be the same device or may be co-located.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, devices of wireless network 100 may communicate with one another using a licensed radio frequency spectrum band and/or an unlicensed radio frequency spectrum band. For example, a base station 110 and a UE 120 may communicate using a RAT such as Licensed-Assisted Access (LAA), Enhanced LAA (eLAA), Further Enhanced LAA (feLAA), NR-Unlicensed (NR-U), and/or the like. In some aspects, a WLAN access point 140 and WLAN station 150 may communicate with one another using only the unlicensed radio frequency spectrum band (and not the licensed radio frequency spectrum band). The unlicensed radio frequency spectrum band may therefore be shared by the base stations 110, the UEs 120, the WLAN access points 140, the WLAN stations 150, and/or the like. Because the unlicensed radio frequency spectrum band may be shared by devices operating under different protocols (e.g., different RATs), transmitting devices may need to contend for access to the unlicensed radio frequency spectrum band prior to transmitting.

As indicated above, FIG. 1 is provided as an example. Other examples may differ from what is described with regard to FIG. 1.

Figure 2:
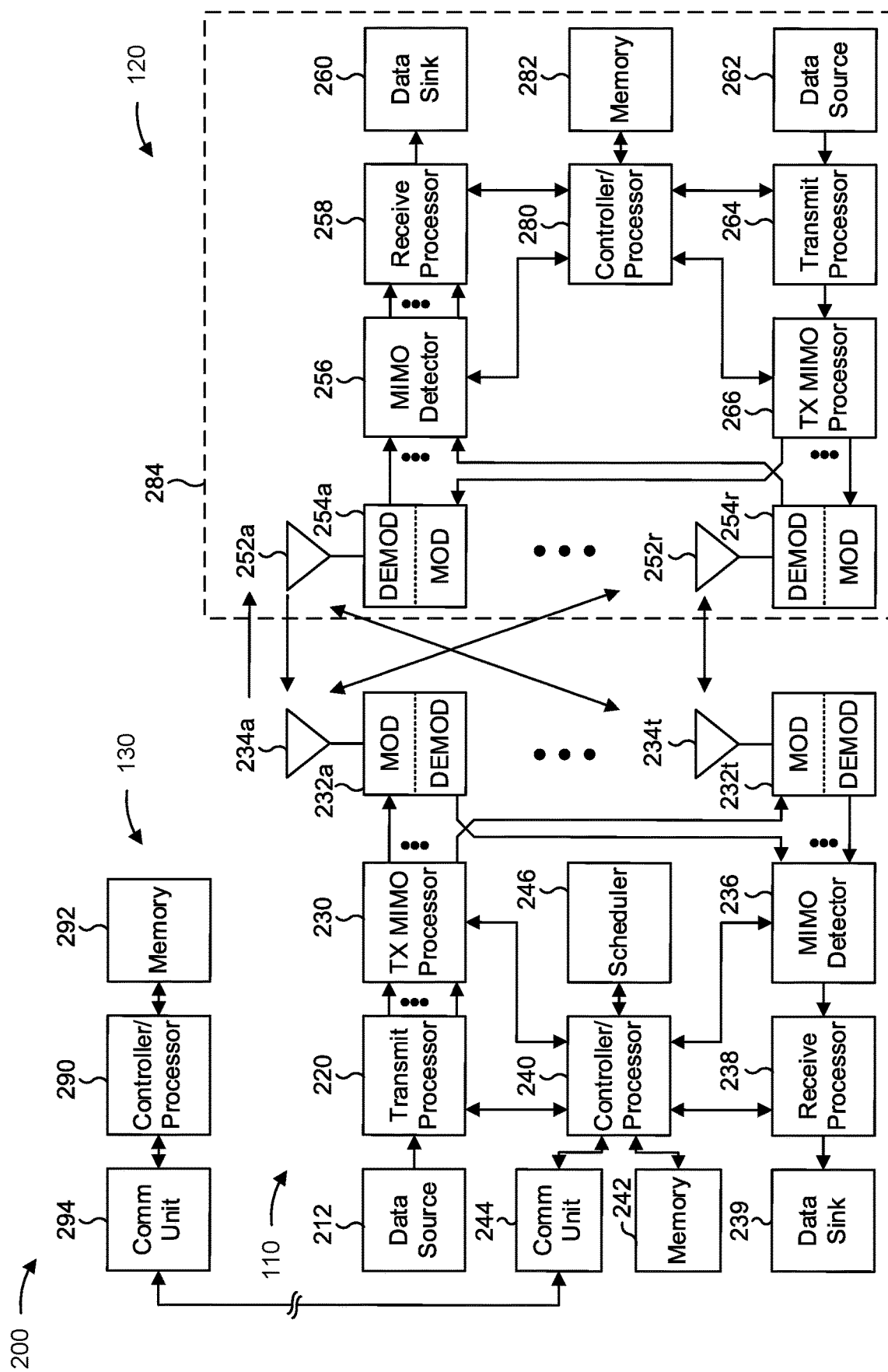
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A-5F and/or FIG. 6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A-5F and/or FIG. 6).

Controller/processor 240 of base station 110, controller/processor 280 of UE 120, and/or any other component(s) of FIG. 2 may perform one or more techniques associated with a UE fixed frame period (FFP) for frame based equipment (FBE) mode in unlicensed spectrum, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, UE 120 may include means for determining an FFP configured for UE 120 in an FBE mode, where the FFP configured for UE 120 includes one or more idle periods and a channel occupancy time that is offset from an FFP configured for base station 110 to communicate with UE 120 over an unlicensed channel, means for refraining from transmitting over the unlicensed channel during the one or more idle periods, where the one or more idle periods at least partially overlap with a time period in which the base station 110 refrains from transmitting over the unlicensed channel, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
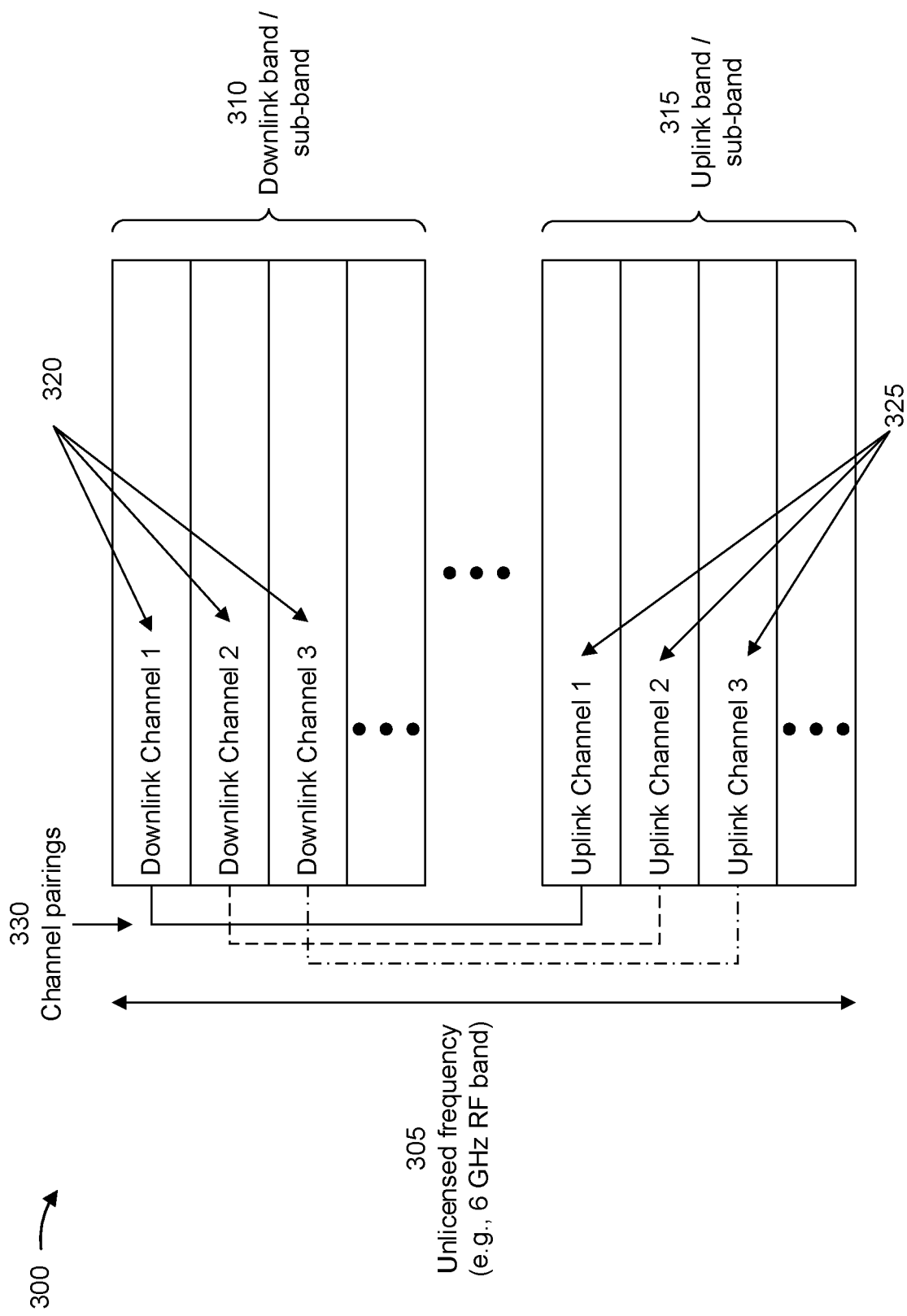
FIG. 3 is a diagram illustrating an example of an unlicensed radio frequency band, in accordance with the present disclosure.

FIG. 3 is a diagram illustrating an example 300 of an unlicensed radio frequency band, in accordance with the present disclosure.

To accommodate increasing traffic demands, there have been various efforts to improve spectral efficiency in wireless networks and thereby increase network capacity (e.g., via use of higher order modulations, advanced MIMO antenna technologies, multi-cell coordination techniques, and/or the like). Another way to potentially improve network capacity is to expand system bandwidth. However, available spectrum in lower frequency bands that have traditionally been licensed or otherwise allocated to mobile network operators has become very scarce. Accordingly, various technologies have been developed to enable a cellular radio access technology (RAT) to operate in unlicensed or other shared spectrum. For example, Licensed-Assisted Access (LAA) uses carrier aggregation on a downlink to combine LTE in a licensed frequency band with LTE in an unlicensed frequency band (e.g., the 2.4 and/or 5 GHz bands already populated by wireless local area network (WLAN) or "Wi-Fi" devices). In other examples, Enhanced LAA (eLAA) and Further Enhanced LAA (feLAA) technologies enable both uplink and downlink LTE operation in unlicensed spectrum, MulteFire is an LTE-based technology that operates in unlicensed and shared spectrum in a standalone mode, NR-U enables NR operation in unlicensed spectrum, and/or the like.

For example, as shown in FIG. 3, and by reference number 305, an unlicensed radio frequency (RF) band, such as a 6 gigahertz (GHz) unlicensed RF band, may span a frequency range and may utilize frequency division duplexing (FDD). In an FDD system, a first band (e.g., a first sub-band of the unlicensed RF band) may be used for downlink communication, as shown by reference number 310, and a second band (e.g., a second sub-band of the unlicensed RF band) may be used for uplink communication, as shown by reference number 315. Downlink communication may refer to communication from a control node to a node (e.g., that is controlled, configured, and/or scheduled by the control node), such as from a base station 110 to a UE 120, from a WLAN access point 140 to a WLAN station 150, and/or the like. Uplink communication may refer to communication from the node to the control node, such as from a UE 120 to a base station 110, from a WLAN station 150 to a WLAN access point 140, and/or the like.

As further shown in FIG. 3, and by reference number 320, the downlink band may be divided into multiple downlink channels, sometimes referred to as downlink frequency channels. Similarly, as shown by reference number 325, the uplink band may be divided into multiple uplink channels, sometimes referred to as uplink frequency channels. As shown by reference number 330, each downlink channel may correspond to a single uplink channel. This may be referred to as channel pairing, where a downlink channel is paired with an uplink channel. In this configuration, a control node and a node may use a particular downlink channel for downlink communication, and may use a particular uplink channel, that is paired with or corresponds to the particular downlink channel, for uplink communication. In example 300, downlink channel 1 is paired with uplink channel 1, downlink channel 2 is paired with uplink channel 2, downlink channel 3 is paired with uplink channel 3, and so on.

While the example 300 illustrated in FIG. 3 shows an unlicensed RF band that utilizes FDD, in some cases, an unlicensed communication channel may utilize time division duplexing (TDD). For example, in an unlicensed communication channel that utilizes TDD, uplink and downlink transmissions may be separated in time and conducted on the same frequency channel. However, unlike TDD in licensed spectrum, a subframe, slot, symbol and/or the like is not restricted to being configured for uplink communication or downlink communication, and may be configured for downlink transmissions by a base station or for uplink transmissions by a UE. Furthermore, unlicensed communication may support dynamic TDD, where an uplink-downlink allocation may change over time to adapt to traffic conditions. For example, to enable dynamic TDD, a wireless device (e.g., a base station, a UE, and/or the like) may determine when to transmit and in which resource to transmit according to an indication of a channel occupancy time structure. In general, the channel occupancy time may include multiple transmission intervals (e.g., multiple slots), and each transmission interval may include one or more downlink resources, one or more uplink resources, one or more flexible resources, and/or the like. In this way, the channel occupancy time structure reduces power consumption, channel access delay, and/or the like.

In an unlicensed RF band (e.g., the 6 GHz unlicensed RF band), all or a portion of the frequency band may be licensed to entities referred to as fixed service incumbents. Accordingly, when operating a cellular RAT in unlicensed spectrum (e.g., using LAA, eLAA, feLAA, MulteFire, NR-U, and/or the like), one challenge that arises is the need to ensure fair coexistence with incumbent (e.g., WLAN) devices that may be operating in the unlicensed spectrum. For example, prior to gaining access to and/or transmitting over an unlicensed channel, a transmitting device (e.g., base station 110, UE 120, and/or the like) may need to perform a listen-before-talk (LBT) procedure to contend for access to the unlicensed channel. The LBT procedure may include a clear channel assessment (CCA) procedure to determine whether the unlicensed channel is available (e.g., unoccupied by other transmitters). In particular, a device performing a CCA procedure may detect an energy level on an unlicensed channel and determine whether the energy level satisfies (e.g., is less than or equal to) a threshold, sometimes referred to as an energy detection threshold and/or the like. When the energy level satisfies (e.g., is below) the threshold, the LBT procedure is deemed to be successful and the transmitting device may gain access to the unlicensed channel for a duration referred to as a channel occupancy time. During the channel occupancy time, the transmitting device can perform one or more transmissions without having to perform any additional LBT operations. However, when the energy level fails to satisfy (e.g., equals or exceeds) the energy detection threshold, the LBT procedure fails and contention to access the unlicensed channel by the transmitting device is unsuccessful.

In cases where the LBT procedure fails due to the CCA procedure resulting in a determination that the unlicensed channel band is unavailable (e.g., because the energy level detected on the unlicensed channel indicates that another device is already using the channel), the CCA procedure may be performed again at a later time. In environments in which the transmitting device may be starved of access to an unlicensed channel (e.g., due to WLAN activity or transmissions by other devices), an extended CCA (eCCA) procedure may be employed to increase the likelihood that the transmitting device will successfully obtain access to the unlicensed channel. For example, a transmitting device performing an eCCA procedure may perform a random quantity of CCA procedures (from 1 to q), in accordance with an eCCA counter. If and/or when the transmitting device senses that the channel has become clear, the transmitting device may start a random wait period based on the eCCA counter and start to transmit if the channel remains clear over the random wait period.

As indicated above, FIG. 3 is provided as an example. Other examples may differ from what is described with regard to FIG. 3.

Figure 4A:
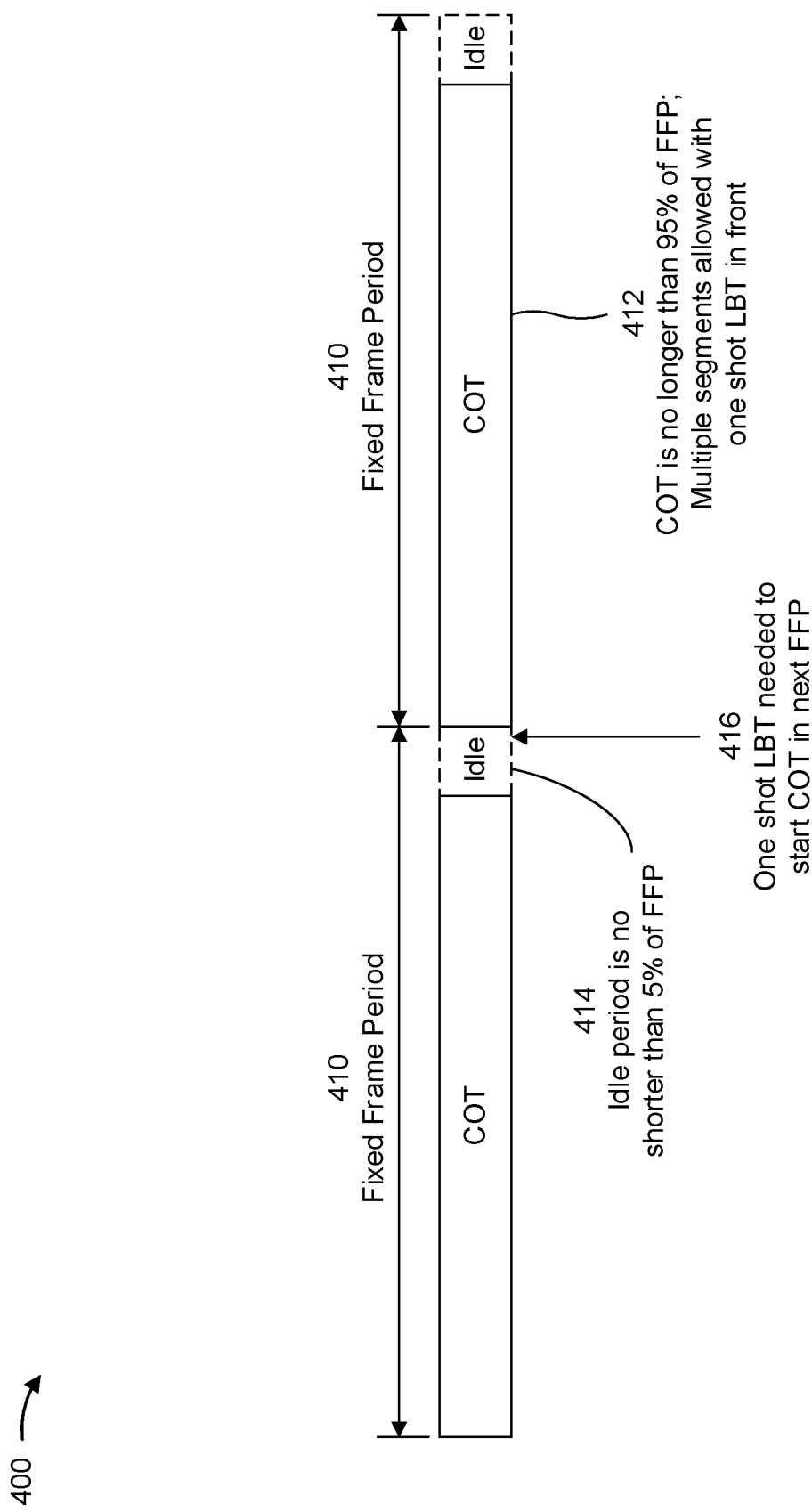
FIGS. 4A-4C are diagrams illustrating examples of a fixed frame period (FFP) that includes a channel occupancy time during which one or more devices may conduct transmissions in an unlicensed channel, in accordance with the present disclosure.
Figure 4B:
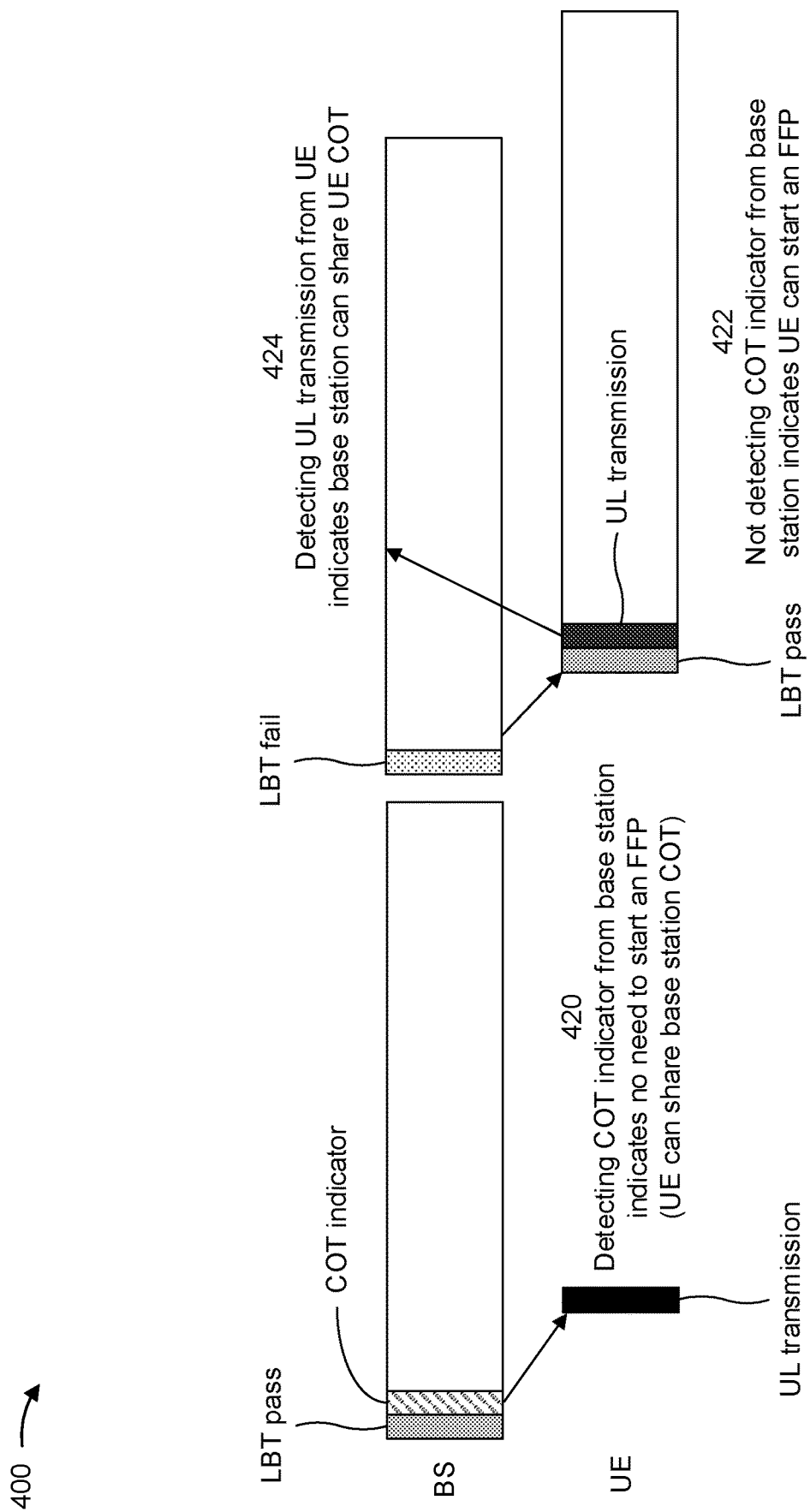
Figure 4C:
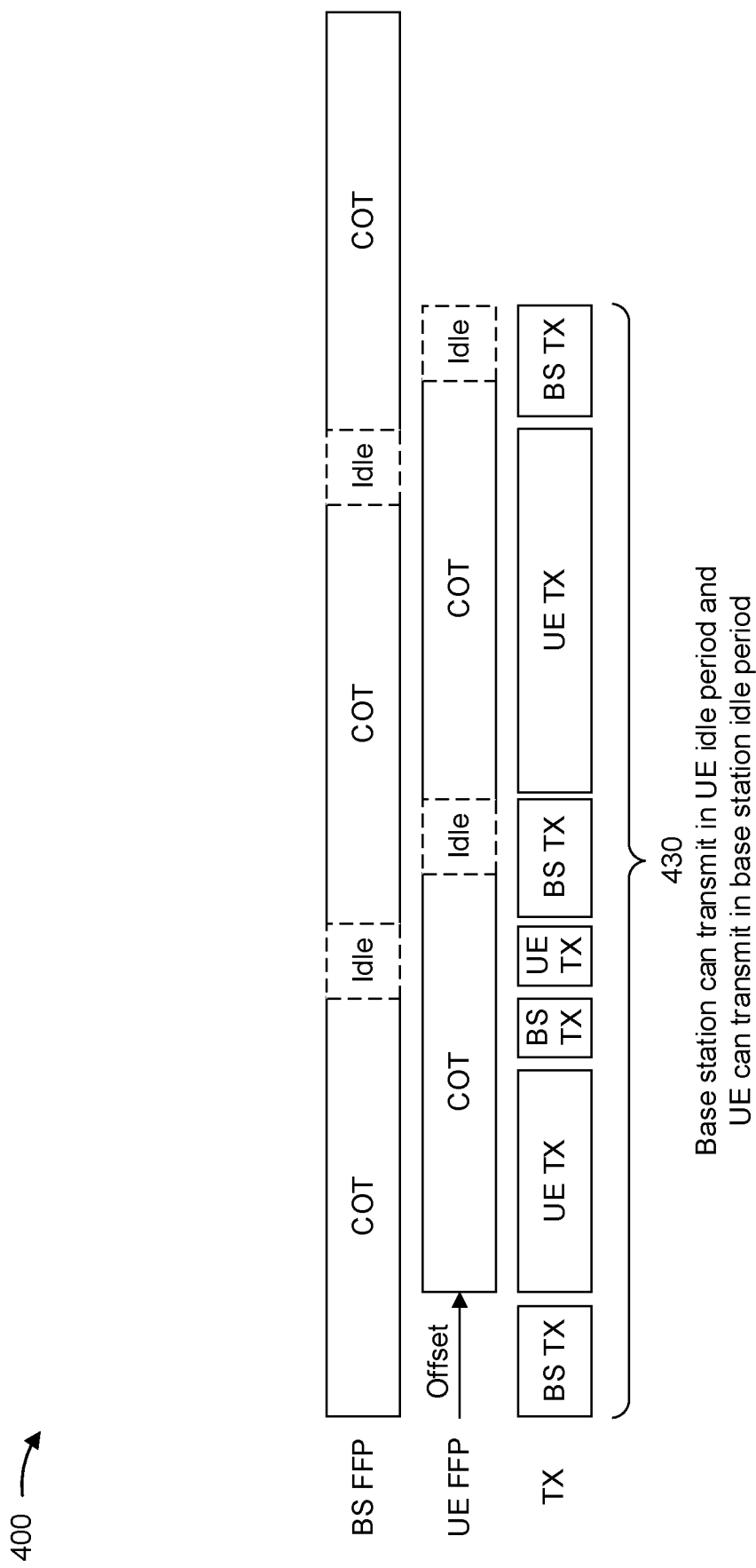

FIGS. 4A-4C are diagrams illustrating examples 400 of a fixed frame period that includes a channel occupancy time during which one or more devices may conduct transmissions in an unlicensed channel, in accordance with the present disclosure.

In a wireless network that supports communication in unlicensed spectrum, an LBT procedure may be performed in either a load based equipment (LBE) mode or a frame based equipment (FBE) mode. In the LBE mode, a transmitting device may perform channel sensing in association with an LBT procedure at any time, and a random backoff is used in cases where the unlicensed channel is found to be busy. In the FBE mode, a base station may perform channel sensing in association with an LBT procedure at fixed time instances, and the base station waits until a fixed time period has elapsed before sensing the unlicensed channel again in cases where the unlicensed channel is found to be busy. In particular, the fixed time instances when the base station performs channel sensing may be defined according to a fixed frame period (FFP).

For example, FIG. 4A depicts an example FFP 410 that a base station may use to communicate in unlicensed spectrum. As shown in FIG. 4A, the FFP 410 may include a channel occupancy time (COT) 412 during which the base station may transmit one or more downlink communications. In some cases, as described below with reference to FIG. 4B, the base station may share the channel occupancy time 412 with a UE to enable the UE to transmit one or more uplink communications during the channel occupancy time 412. As shown in FIG. 4A, the FFP 410 may further include an idle period 414 (sometimes referred to as a gap period and/or the like) at an end of the FFP 410, after the channel occupancy time 412. In particular, the FFP 410 includes the idle period 414 to provide time for performing an LBT procedure for a next FFP 410. The FFP 410, including the channel occupancy time 412 and the idle period 414, may have a 1 millisecond (ms) duration, a 2 ms duration, a 2.5 ms duration, a 4 ms duration, a 5 ms duration, a 10 ms duration, and/or the like. Within every two radio frames (e.g., even radio frames), starting positions of the FFPs 410 may be given by i*P, where i={0, 1, . . . , 20/P−1} and P is the duration of the FFP 410 in ms. For a given subcarrier spacing (SCS), the idle period 414 may be a ceiling value for a minimum idle period allowed by regulations, divided by Ts, where the minimum duration of the idle period 414 is a maximum of 100 microseconds (µs) and 5% of the duration of the FFP 410, and Ts is the symbol duration for the given SCS. Accordingly, the idle period 414 may generally occupy no less than 5% of the duration of the FFP 410, and the channel occupancy time 412 may occupy no more than 95% of the duration of the FFP 410.

An FFP configuration for the FBE mode may be included in a system information block (e.g., SIB-1) or signaled to a UE in UE-specific radio resource control (RRC) signaling. If the network indicates FBE operation for fallback downlink and uplink grants, for an indication of LBT Category 2 (25 µs), or LBT without random backoff, or Category 4, or LBT with random backoff and a variable size contention window, the UE may follow a mechanism whereby one 9 µs slot (e.g., one shot LBT) is measured within a 25 µs interval. UE transmissions within the FFP 410 may occur if one or more downlink signals or downlink channels (e.g., a physical downlink control channel (PDCCH), a synchronization signal block (SSB), a physical broadcast channel (PBCH), remaining minimum system information (RMSI), a group common PDCCH (GC-PDCCH), and/or the like) are detected within the FFP 410. The same 2-bit field may be used in LBE mode and FBE mode to indicate an LBT type, a cyclic prefix extension, a channel access priority class indication, and/or the like.

In Release 16 NR unlicensed (NR-U) FBE mode, only a base station can act as an initiating device, and a UE may only act as a responding device. In NR-U FBE mode, channel access rules may thus be as follows. If the base station is to initiate a channel occupancy time 412, a Category 1 (Cat-1) LBT procedure may not apply and the base station may perform a Category 2 (Cat-2) LBT procedure in the idle period 414 just prior to an FFP 410. If the base station is to transmit a downlink burst in the channel occupancy time 412 initiated by the base station, the base station may perform a Cat-1 LBT procedure if a gap from a previous downlink or uplink burst is within 16 µs, and may otherwise perform a Cat-2 LBT procedure if the gap is more than 16 µs. If the UE is to transmit an uplink burst in the channel occupancy time 412 initiated by the base station, the UE may perform a Cat-1 LBT procedure if the gap from the previous downlink or uplink burst is within 16 µs, and may otherwise perform the Cat-2 LBT procedure if the gap is greater than 16 µs. Notably, the Cat-2 LBT procedure for FBE mode may be different from the Cat-2 LBT procedure (25 µs or 16 µs) in LBE mode. In some aspects, one 9 µs measurement right before the transmission may be needed, with at least 4 µs for measurement. As shown by reference number 416, the 9 µs measurement needed to start a channel occupancy time 412 in a next FFP 410 may be referred to as a one-shot LBT. However, neither the Cat-1 LBT procedure nor the Cat-2 LBT procedure applies in cases where the UE is to initiate a channel occupancy time in FBE mode, because a UE cannot initiate a channel occupancy time in Release 16 NR-U FBE mode.

Accordingly, although a wireless network can be configured to use unlicensed spectrum to achieve faster data rates, provide a more responsive user experience, offload traffic from a licensed spectrum, and/or the like, one limitation in FBE mode is that a UE cannot initiate a channel occupancy time to perform uplink transmissions. In some cases, in order to improve access, efficiency, and/or the like for an unlicensed channel, a wireless network may permit a base station to share a channel occupancy time with a UE. For example, as shown in FIG. 4B, and by reference number 420, a base station may transmit a COT indicator to one or more UEs (e.g., using group common downlink control information (DCI)) in cases where the base station successfully contends for access to an unlicensed channel (e.g., by performing an LBT procedure that passes), and the COT indicator from the base station may indicate that the one or more UEs do not need to start an FFP. Instead, the one or more UEs can share the channel occupancy time acquired by the base station and transmit one or more uplink communications during the shared channel occupancy time.

In a fully controlled environment, permitting only the base station to contend for access to the unlicensed channel and share a channel occupancy time initiated by the base station with one or more UEs may be sufficient. For example, as described herein, a "fully controlled" environment may be an environment that is restricted or otherwise controlled such that there will be no other RAT or operators operating in the coverage area. Consequently, in a fully controlled environment, an LBT procedure may always pass, even in FBE mode. In practice, however, a fully controlled environment may be difficult to achieve because there may be a chance that some other RAT is operating even in cases where the environment is cleared. For example, an employee in an otherwise cleared factory environment may be carrying a WLAN station that transmits a WLAN access probe even though there are no WLAN access points deployed in the factory environment. Accordingly, in an almost fully controlled environment, there is a small chance that an LBT procedure performed by a base station will fail, which may result in unacceptable performance for services having stringent quality of service requirements (e.g., ultra-reliable low-latency communication (URLLC), industrial internet of things (IIoT) applications, and/or the like). For example, even in cases where an LBT failure rate is as low as $10^{-3}$, there is a $10^{-3}$ probability that a URLLC packet scheduled to be delivered in an FFP cannot be delivered because both the base station and any UE(s) in communication with the base station have to surrender the entire FFP due to failure of an LBT procedure performed by the base station at the beginning of the FFP. The $10^{-3}$ failure probability may be insufficient to satisfy a URLLC reliability requirement, which typically requires a reliability of $10^{-6}$ or better. Furthermore, these problems are exacerbated in uncontrolled environments where there may be many incumbent and/or competing devices contending for access to the unlicensed channel.

Accordingly, in cases where an LBT procedure is to be performed in the FBE mode prior to transmitting on an unlicensed channel, a UE may be unable to transmit uplink data in cases where the base station fails the LBT procedure and/or in cases where the base station does not perform the LBT procedure because the base station does not have a need to transmit downlink data. Consequently, a UE may be permitted to act as an initiating device to perform an LBT procedure in the FBE mode in cases where the base station fails the LBT procedure or otherwise does not transmit a COT indicator to share a channel occupancy time acquired by the base station (e.g., because the base station did not perform the LBT procedure due to a lack of downlink activity). For example, as further shown in FIG. 4B, and by reference number 422, the UE may perform an LBT procedure to start an FFP and initiate a COT in which to transmit one or more uplink communications in cases where the UE does not detect a COT indicator from the base station. Accordingly, as further shown by reference number 424, the UE may transmit one or more uplink communications over the unlicensed channel if the LBT procedure passes, and detecting the uplink transmission from the UE may indicate that the base station can share the channel occupancy time acquired by the UE to perform downlink transmissions.

In some aspects, allowing the UE to initiate a channel occupancy time in FBE mode may improve access to the unlicensed channel, reduce uplink latency, conserve power, reduce interference, and/or the like. For example, when the UE initiates a channel occupancy time, the UE can use the channel occupancy time to transmit a physical random access channel (PRACH) for initial network access. In particular, during initial network access, the UE may not yet be configured with a system information radio network temporary identifier (SI-RNTI) or another known RNTI used to monitor for a downlink transmission (e.g., downlink control information (DCI) scrambled with the SI-RNTI or other known RNTI) to determine whether the base station has acquired a channel occupancy time. This may restrict the ability of the UE to transmit a PRACH for initial network, whereby enabling the UE to initiate a channel occupancy time may enable uplink PRACH transmissions before the UE has been configured to monitor for downlink transmissions from the base station.

Furthermore, allowing the UE to initiate a channel occupancy time enables the UE to transmit a physical uplink control channel (PUCCH) and/or a physical uplink shared channel (PUSCH) earlier in an FFP associated with a base station. For example, when sharing a channel occupancy time acquired by a base station, the UE has to confirm that the base station acquired the channel occupancy time in an earlier portion of the FFP in order to enable transmissions in a later portion of the FFP (e.g., the UE needs to leave time in the earlier portion of the base station FFP to allow time for the downlink transmission from the base station, time for the UE to process the downlink transmission, and/or the like). Furthermore, allowing the UE to initiate a channel occupancy time may save power at the base station and/or reduce interference over the unlicensed channel. For example, in order to share a channel occupancy time and enable uplink transmission within the shared channel occupancy time, the base station needs to actively transmit one or more downlink communications in the earlier portion of the FFP, even if the base station does not have a need to transmit the downlink communication(s). This may result in additional power consumption at the base station and extra interference on the unlicensed channel, which can be avoided by allowing the UE to initiate a channel occupancy time. Furthermore, allowing the UE to initiate a channel occupancy time rather than relying on sharing a channel occupancy time acquired by the base station may avoid problems that may otherwise arise where downlink signal detection has a reliability limitation.

Although allowing a UE to initiate a channel occupancy time during which the UE can conduct uplink transmissions over an unlicensed channel can improve channel access, reduce uplink latency, conserve power, reduce interference, and/or the like, challenges may arise in cases where a base station and one or more UEs acquire a channel occupancy time for the same unlicensed channel. For example, as shown in FIG. 4C, an FFP that is configured for a UE that is allowed to initiate a channel occupancy time in FBE mode may generally have a start time that is offset from a start time of the FFP that is configured for the base station. Otherwise, if the FFP configured for the UE were to start at the same time as the FFP configured for the base station, the UE and the base station may each contend for access to the unlicensed channel at the same time (e.g., by performing an LBT procedure in the idle period prior to the FFP at the same time), which may result in the base station failing and the UE failing to detect each other. Furthermore, because the FFP configured for the base station and the FFP configured for the UE are both required by regulation to have an idle period at the end of the FFP, the idle period in the FFP configured for the base station would not be aligned with the idle period in the FFP configured for the UE.

As shown in FIG. 4C and by reference number 430, in cases where the base station and the UE both successfully acquire a channel occupancy time, the base station may transmit in the channel occupancy time of the FFP configured for the base station during the idle period of the FFP configured for the UE, and vice versa. For example, FIG. 4C illustrates an example transmission timeline (Tx) in which a base station transmits over an unlicensed channel during a channel occupancy time acquired by the base station, and a UE may then transmit over the unlicensed channel during a channel occupancy time acquired by the UE (e.g., during a gap in the transmissions by the base station). The base station may later resume transmitting during the channel occupancy time acquired by the base station (e.g., by performing a Cat-2 LBT procedure during a gap in the transmissions by the UE), and the base station may then refrain from transmitting during the idle period that follows the channel occupancy time.

However, because the UE has acquired a channel occupancy time, the UE may perform a Cat-2 LBT procedure and resume transmitting during a portion of the UE channel occupancy time that overlaps with the idle period in the base station FFP, and the base station may then acquire another channel occupancy time in a next FFP and transmit during a portion of the base station channel occupancy time that overlaps with the idle period in the UE FFP. In other words, due to the offset between the UE FFP and the base station FFP (and resulting unaligned idle periods), the base station channel occupancy time may overlap with the UE idle period and the UE channel occupancy time may overlap with the base station idle period. As a result, each node may transmit during the idle period of the other node without leaving a gap that is long enough for other devices (e.g., LBE devices) to perform a Cat-4 LBT procedure and acquire the unlicensed channel, which completely starve the other devices of access to the unlicensed channel.

Some aspects described herein relate to techniques and apparatuses to configure or otherwise provide a UE FFP structure that may be used to communicate over an unlicensed channel without blocking other devices from successfully contending for access to the unlicensed channel. In particular, an FFP configured for a UE in FBE mode may include a channel occupancy time that is offset from an FFP configured for a base station communicating with the UE over an unlicensed channel (e.g., to ensure that the base station and the UE can detect each other when contending for access to the unlicensed channel). Furthermore, the FFP configured for the UE may include one or more idle periods that at least partially overlap with a time period in which the base station refrains from transmitting over the unlicensed channel. In this way, the UE may refrain from transmitting over the unlicensed channel during the one or more idle periods, and the (at least partial) overlap between the one or more idle periods in the FFP configured for the UE and the time period in which the base station refrains from transmitting over the unlicensed channel may ensure that other devices (e.g., LBE devices, such as WLAN devices) will be able to contend for access to the unlicensed channel when neither the base station nor the UE are transmitting.

As indicated above, FIGS. 4A-4C are provided as examples. Other examples may differ from what is described with regard to FIGS. 4A-4C.

FIGS. 5A-5F are diagrams illustrating examples 500 associated with providing a UE FFP for FBE mode in unlicensed spectrum, in accordance with the present disclosure. As shown in FIGS. 5A-5F, examples 500 include a base station (e.g., base station 110 and/or the like) in communication with one or more UEs (e.g., UE 120 and/or the like) in a wireless network (e.g., wireless network 100 and/or the like). Furthermore, as described herein, the base station and the UE(s) may be configured to communicate on an uplink and a downlink using one or more unlicensed channels in FBE mode. In some aspects, as described herein, the UE(s) may be allowed to initiate an LBT procedure to acquire a channel occupancy time in FBE mode, and an FFP configured for each UE may be structured such that a start time of the UE channel occupancy time is offset from a start time of the base station channel occupancy time. Furthermore, as described herein, the FFP configured for the UE and the FFP configured for the base station may be configured such that communication between the base station and the UE(s) include one or more silent periods (e.g., idle periods within an FFP, silent periods between FFPs, and/or the like) that at least partially overlap. In this way, other devices (e.g., LBE devices) may perform a Cat-4 LBT procedure during the one or more silent periods in order to acquire access to the unlicensed channel(s).

Figure 5A:
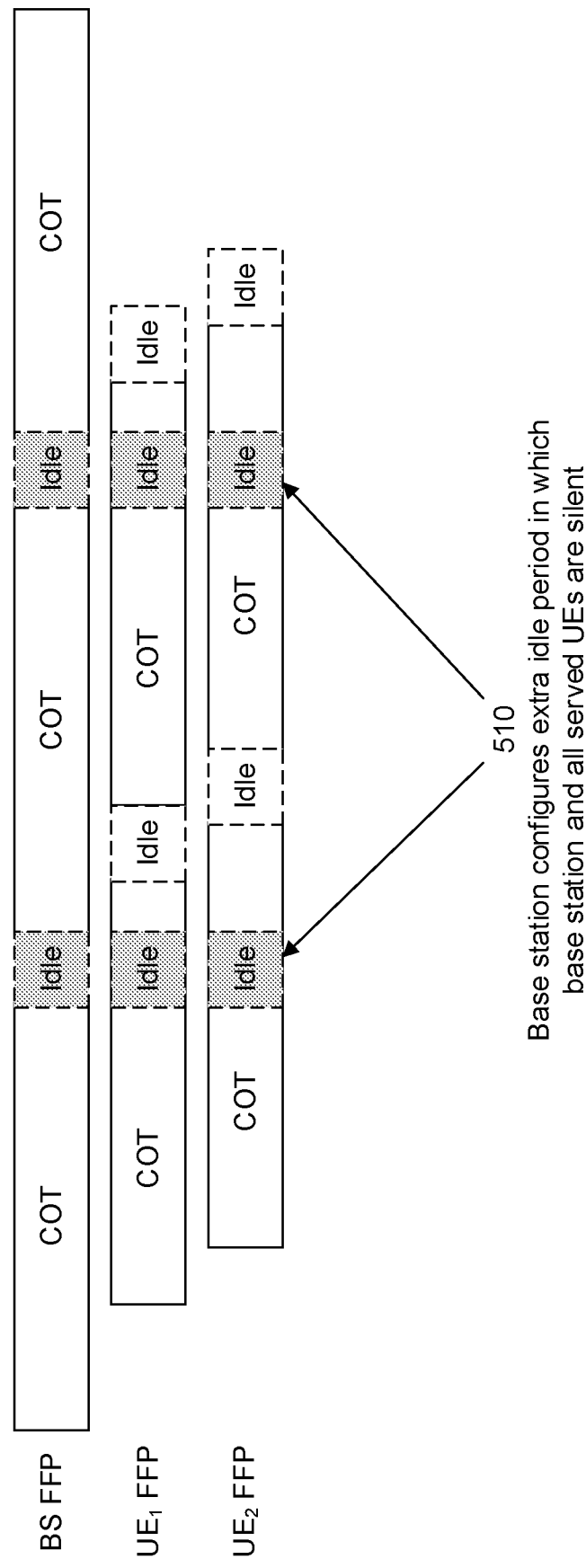
FIGS. 5A-5F are diagrams illustrating examples associated with providing a UE FFP for frame based equipment (FBE) mode in unlicensed spectrum, in accordance with the present disclosure.

For example, as shown in FIG. 5A, and by reference number 510, the base station may configure an extra idle period for one or more UEs communicating with the base station over an unlicensed channel such that the base station and all served UEs communicating with the base station are silent (e.g., refrain from transmitting) during the extra idle period. For example, in some aspects, the base station may transmit information indicating a structure of the FFP configured for the base station in system information (e.g., in a system information block type 1 (SIB-1), in UE-specific RRC signaling for an FBE secondary cell (Scell) use case, and/or the like). Accordingly, each UE served by the base station may know the duration of the FFP configured for the base station, the starting positions of the FFPs, the duration idle period of the FFP, and/or the like. Furthermore, in some aspects, the base station may transmit configuration information to each UE (e.g., in RRC signaling) to indicate the extra idle period in which the respective UE is to be silent. Accordingly, as shown in FIG. 5A, the configuration information transmitted by the base station may modify the structure of the FFP configured for each UE such that the UE is to refrain from transmitting during the idle period at the end of the FFP configured for the UE and further refrain from transmitting during the extra idle period configured by the base station.

In some aspects, as shown in FIG. 5A, the extra idle period may be configured to be aligned across all UEs served by the base station in order to leave a common gap during which LBE devices (or other FBE devices) can contend for access to the unlicensed channel. For example, in FIG. 5A, a first UE (shown as UE1) is configured with a first FFP that starts a first offset after an FFP configured for the base station, and a second UE (shown as UE2) is configured with a second FFP that starts a second offset after the FFP configured for the base station. In this case, the idle period at the end of the FFP configured for the base station are not aligned with the idle periods at the end of the FFPs configured for the first UE and the second UE, and the idle periods at the end of the FFPs configured for the first UE and the second UE are not aligned with each other. Accordingly, the base station configures the extra idle period to be aligned across the first UE and the second UE (and any other UEs that may be communicating with the base station over the unlicensed channel) to ensure that there is a common period in which all UEs served by the base station are to refrain from transmitting over the unlicensed channel. Furthermore, in some aspects, the extra idle period may be aligned with the idle period in the FFP configured for the base station such that the base station also refrains from transmitting during the common period in which all UEs served by the base station are to refrain from transmitting over the unlicensed channel.

Alternatively, in some aspects, the extra idle period that is configured to be aligned across all of the served UEs may be different from the idle period in the FFP configured for the base station. For example, the extra idle period may have a different start time or a different end time than the idle period in the base station FFP. However, in general, the extra idle period may at least partially overlap with the base station idle period to ensure that there is a period of time in which neither the base station nor the served UE(s) are transmitting over the unlicensed channel. Alternatively, in cases where the extra idle period does not overlap with the base station idle period, the UE(s) may be configured to apply one or more rules to ensure that the UE(s) refrain from transmitting during an idle period that overlaps with a time period in which the base station is not transmitting over the unlicensed channel.

For example, in cases where the UE(s) detect a downlink signal from the base station during the channel occupancy time portion of the base station FFP, the UE(s) may honor the normal idle period in the base station FFP (e.g., the UE(s) may refrain from transmitting during the normal idle period when the base station is guaranteed to not be transmitting). Otherwise, in cases where the UE(s) fail to detect a downlink signal from the base station during the channel occupancy time portion of the base station FFP, the UE(s) may infer that the base station did not acquire a channel occupancy time and may honor the extra idle period that is aligned across all served UEs but different from the idle period in the base station FFP. In this case, the UEs may determine that the base station is not transmitting over the unlicensed channel during the base station channel occupancy time due to the lack of downlink activity, whereby refraining from transmitting during the extra idle period that is aligned across all served UEs may be sufficient to ensure that neither the base station nor any of the served UEs are transmitting during the extra idle period.

Accordingly, in the example shown in FIG. 5A, the idle period in the base station FFP and/or the extra idle period aligned across all served UEs may serve as a global idle period in which the base station and all UEs served by the base station refrain from transmitting over the unlicensed channel. In this way, the idle period in the base station FFP and/or the extra idle period aligned across all served UEs may provide an opportunity for neighbor devices (e.g., LBE devices) to step in and acquire access to the unlicensed channel. Furthermore, as shown and described above, the extra idle period may be common among all served UEs even if there are multiple UEs that have different FFP structures (e.g., different offsets from the base station FFP).

However, one penalty of the example shown in FIG. 5A is that the FFP(s) configured for the UE(s) include two idle periods, which may reduce resource utilization by decreasing the time in which the UE(s) may transmit over the unlicensed channel. In some cases, the reduced resource utilization may be an acceptable penalty in cases where the channel occupancy time acquired by the UE(s) does not need to be used extensively. However, in other cases (e.g., the UE(s) have a significant amount of uplink data to transmit), the additional idle period may result in degraded performance.

Figure 5B:
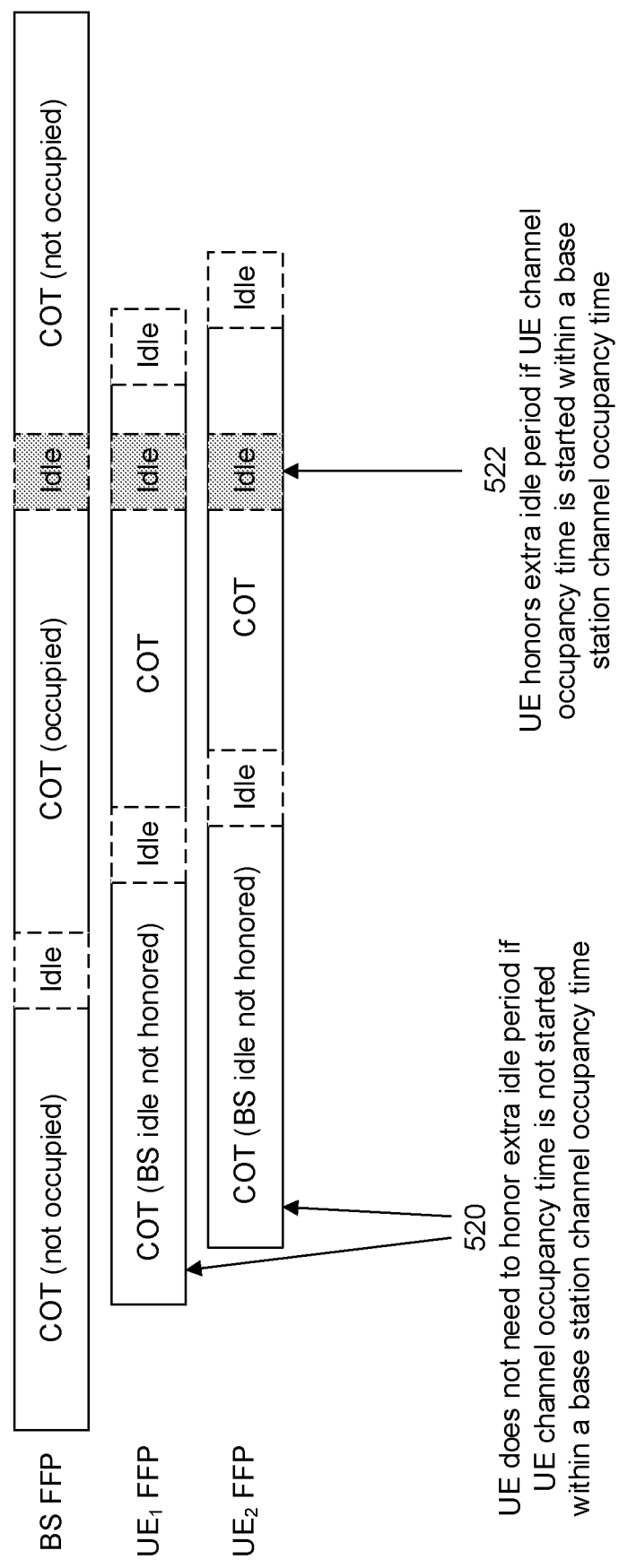

Accordingly, as shown in FIG. 5B, and by reference number 520, the UE(s) may be permitted to not honor the extra idle period configured by the base station (e.g., the UE(s) may be permitted to transmit during the extra idle period) if the channel occupancy time started by the UE(s) is not within a channel occupancy time started by the base station. For example, in cases where the base station does not contend for access to the unlicensed channel, the base station would not start a channel occupancy time and therefore does not transmit a downlink signal (e.g., a COT indicator and/or the like) during an earlier portion of the base station FFP. In such cases, the UE(s) may determine that the base station is not occupying the unlicensed channel based at least in part on the lack of a downlink signal from the base station. Accordingly, based at least in part on the UE(s) determining that the base station is not transmitting during the channel occupancy time of the base station FFP, the UE(s) need not honor the idle period in the base station FFP, and the UE(s) may refrain from transmitting during only the idle period at the end of the UE FFP(s). However, as shown by reference number 522, the UE(s) may be configured to honor the extra idle period (e.g., the base station idle period) in cases where the channel occupancy time started by the UE(s) is within a channel occupancy time started by the base station. In this way, resource utilization over the unlicensed channel may be increased while still providing opportunities for other devices to perform an LBT procedure and acquire channel access.

Figure 5C:
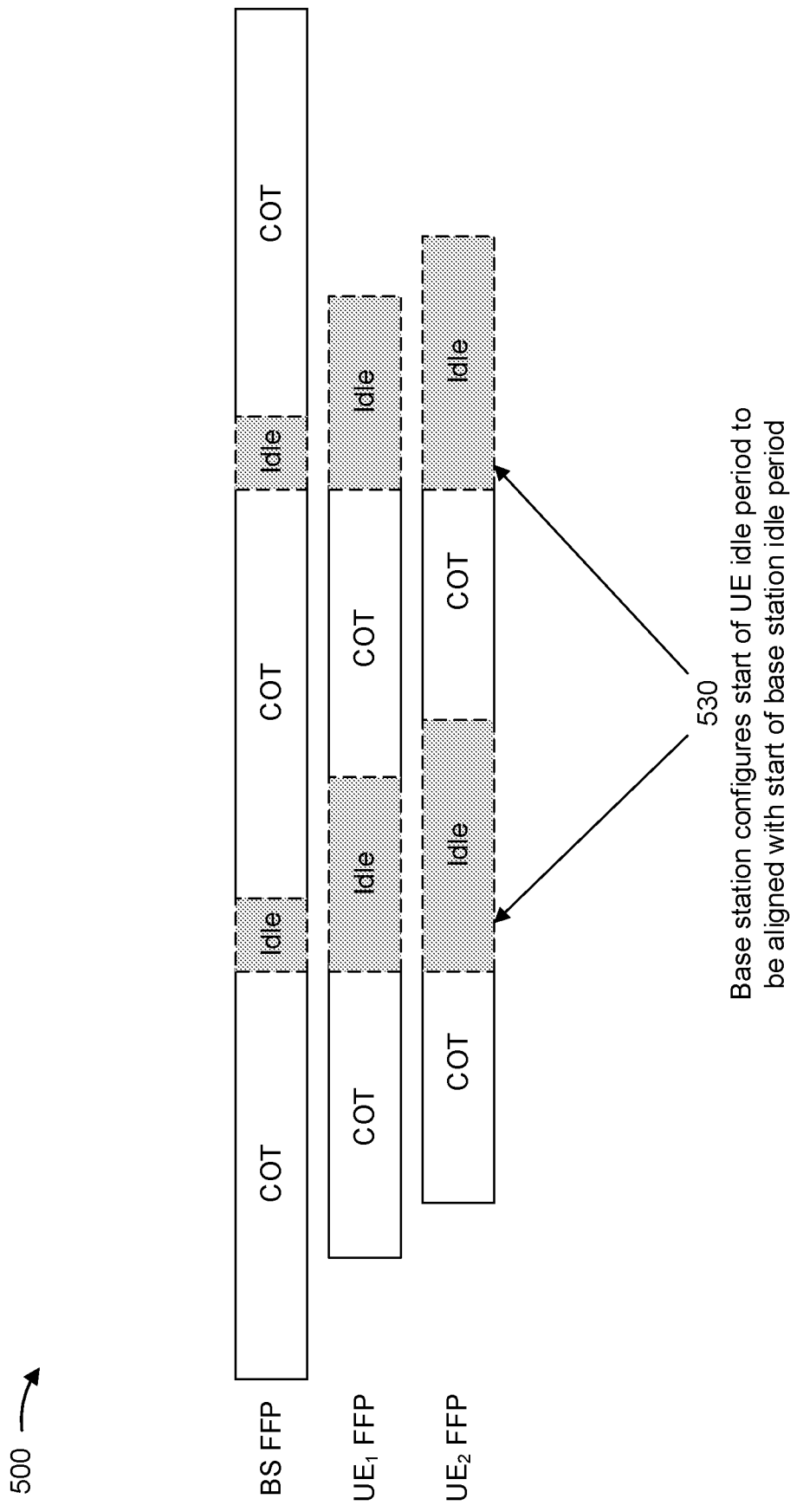

Alternatively, as shown in FIG. 5C, and by reference number 530, the FFP(s) configured for the UE(s) may be configured to have a single idle period with a start time that is aligned with a start time of the idle period in the base station FFP. In this case, an end time of the single idle period may be aligned with an end time of the UE FFP. In other words, in the example shown in FIG. 5C, the base station and the UE(s) may all be silent during the idle period in the base station FFP and aligning the end time of the idle period(s) in the UE FFP(s) with an end time of the UE FFP(s) may result in the UE FFP(s) having an idle time that is longer than required. However, as described above with reference to FIG. 4A, an idle period is generally required to be at least 5% of the total duration of an FFP, meaning that the idle period is permitted to be longer than the minimum required duration. In this case, because the idle period(s) in the UE FFP(s) have a start time aligned with the start of the base station idle period and an end time aligned with an end time of the UE FFP, the UE(s) may refrain from (e.g., may not resume) transmitting in the channel occupancy time started by the UE(s) after the idle period in the base station FFP has elapsed. In this way, although the example shown in FIG. 5C may shorten the time period in which the UE(s) are allowed to transmit over the unlicensed channel, the extended idle period in the UE FFP(s) may conserve power, conserve processing resources, reduce interference, and/or the like by extending the amount of time that the UE(s) refrain from transmitting, by avoiding a need to perform a Cat-2 LBT procedure to resume transmitting, and/or the like.

Figure 5D:
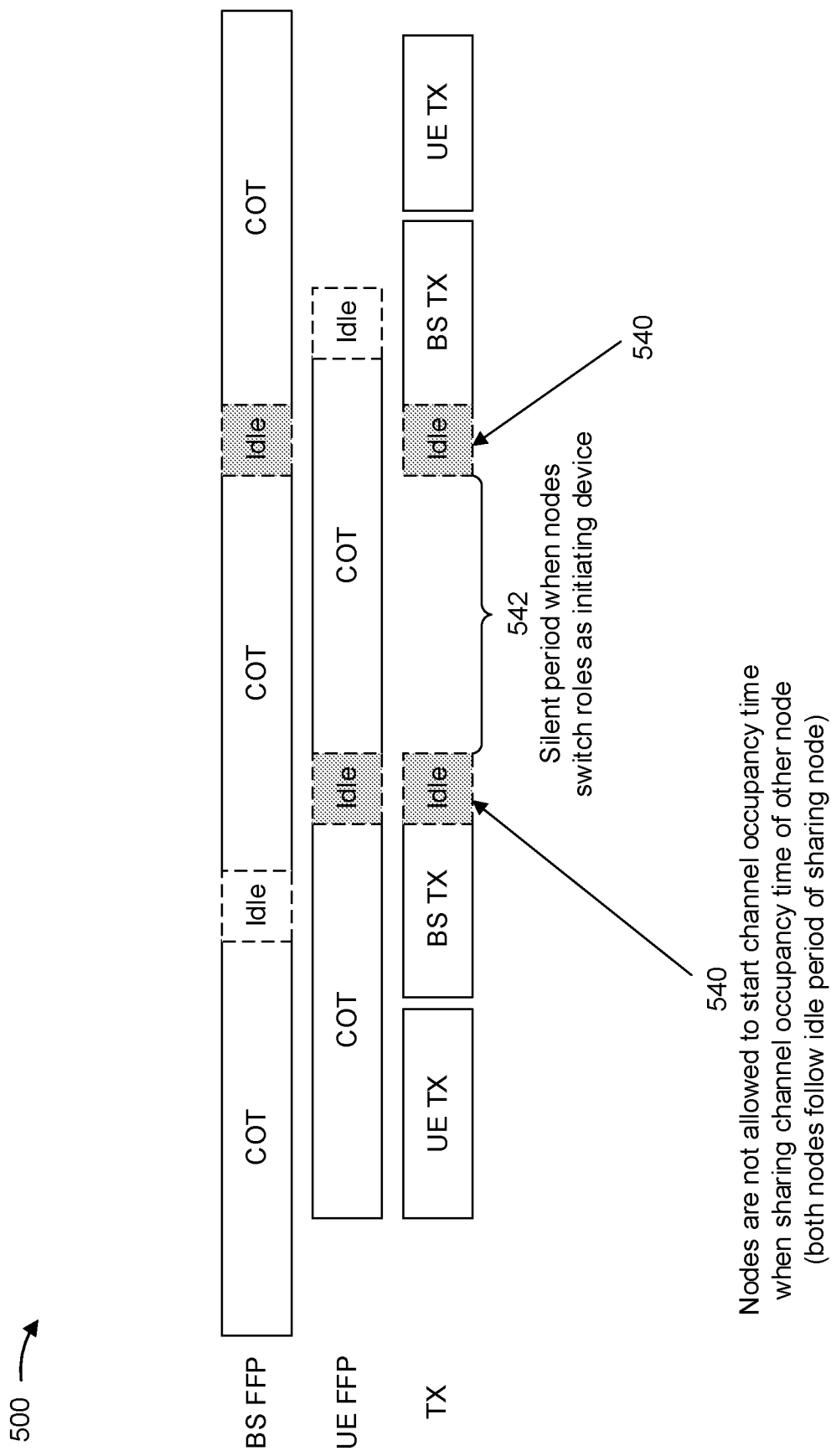

In another example, as shown in FIG. 5D, and by reference number 540, the base station and each UE served by the base station may be restricted from starting a channel occupancy time when sharing a channel occupancy time of the other node. In such cases, both nodes (e.g., the node that started the channel occupancy time and the node sharing the channel occupancy time) may follow the idle period of the node sharing the channel occupancy time. In other words, between the base station and the UE, the idle period to be enforced may be determined according to which node acquired the channel occupancy time. For example, as described above, another node (e.g., an LBE device) may be starved of channel access in cases where a first node (e.g., a base station or UE) starts a first channel occupancy time and is able to transmit in the idle period of a second node (e.g., the base station or the UE), which occurs during the first channel occupancy time started by the first node. Furthermore, in such cases, the idle period when the first node performs a Cat-2 LBT procedure to start a channel occupancy time in a next FFP occurs during a second channel occupancy time acquired by the second node. The channel occupancy time for each node therefore covers the idle period in the FFP of the other node, creating a mutual cover that blocks other devices from successfully contending for access to the unlicensed channel.

Accordingly, to disable or otherwise break the mutual cover, the base station may be restricted from contending for access to the unlicensed channel (e.g., cannot start a channel occupancy time) if the base station is within a channel occupancy time started by the UE, in which case the base station sharing the channel occupancy time of the UE may follow the idle period in the FFP configured for the UE. Similarly, the UE may be restricted from contending for access to the unlicensed channel (e.g., the UE cannot start a channel occupancy time) if the UE is within a channel occupancy time started by the base station, in which case the UE sharing the channel occupancy time of the base station may follow the idle period in the base station FFP. In this way, the base station and the UE cannot start separate channel occupancy times that overlap with each other, and following the idle period in the FFP of the node sharing the channel occupancy time may ensure that there is a silent period in which neither device is transmitting. Furthermore, in cases where multiple UEs are permitted to start respective channel occupancy times, the UEs may be configured with respective FFPs that are aligned with each other to ensure that the channel occupancy times started by the UEs do not cover the idle period(s) in the FFP(s) of the other UE(s).

Furthermore, as shown by reference number 542, preventing a node from starting a channel occupancy time within a channel occupancy time shared by the other node may result in an additional silent period when the nodes switch roles as initiating devices. For example, FIG. 5D illustrates a transmission timeline in which the UE starts a channel occupancy time that is shared with a base station, whereby the UE and the base station are both silent during the idle period in the UE FFP. As further shown, the base station then passes an LBT procedure to start a channel occupancy time in a next FFP, whereby the UE and the base station switch roles as devices initiating the channel occupancy time. Accordingly, there is an additional silent period between the channel occupancy time started by the UE and the channel occupancy time started by the base station (e.g., UE-to-BS channel occupancy time switching). Furthermore, the silent period may similarly be present in cases where the earlier channel occupancy time is started by the base station and the later channel occupancy time is started by the UE (e.g., BS-to-UE channel occupancy time switching).

Figure 5E:
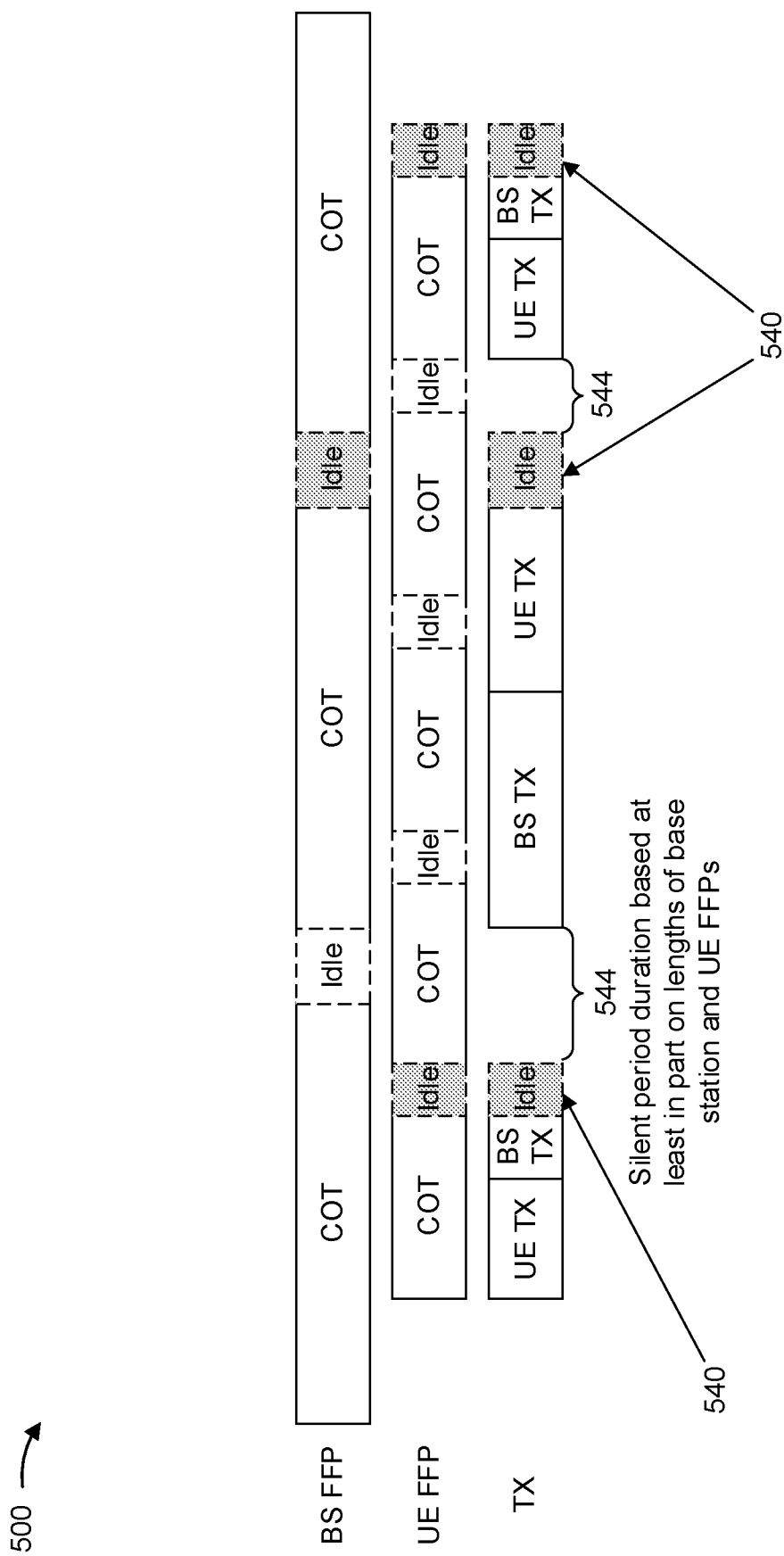

In general, a duration of the silent period when the UE and the base station switch roles as devices initiating a channel occupancy time may be based at least in part on respective lengths of the base station FFP and the UE FFP. For example, FIG. 5D illustrates a transmission timeline where the base station FFP and the UE FFP are the same length. However, as shown in FIG. 5E, a duration of the silent period may be adjusted by changing the length of the base station FFP and/or the UE FFP. For example, as shown by reference number 544, the duration of the silent period may be reduced in cases where the UE FFP has a shorter length than the base station FFP (e.g., there may be a shorter time period between channel occupancy times when the base station and the UE switch roles as initiating devices).

In the examples shown in FIG. 5D and FIG. 5E, each node (including the base station and any UEs served by the base station) is not allowed to start a channel occupancy time within a channel occupancy time started by the other node to avoid a mutual cover whereby two (or more) nodes are allowed to transmit during all of the idle periods. Although preventing each node from starting a channel occupancy time in the channel occupancy time of another node is sufficient to break the mutual cover, preventing each node from starting a channel occupancy time in the channel occupancy time of another node is not necessary to break the mutual cover. Instead, the mutual cover needs to be broken from one side only.

Figure 5F:
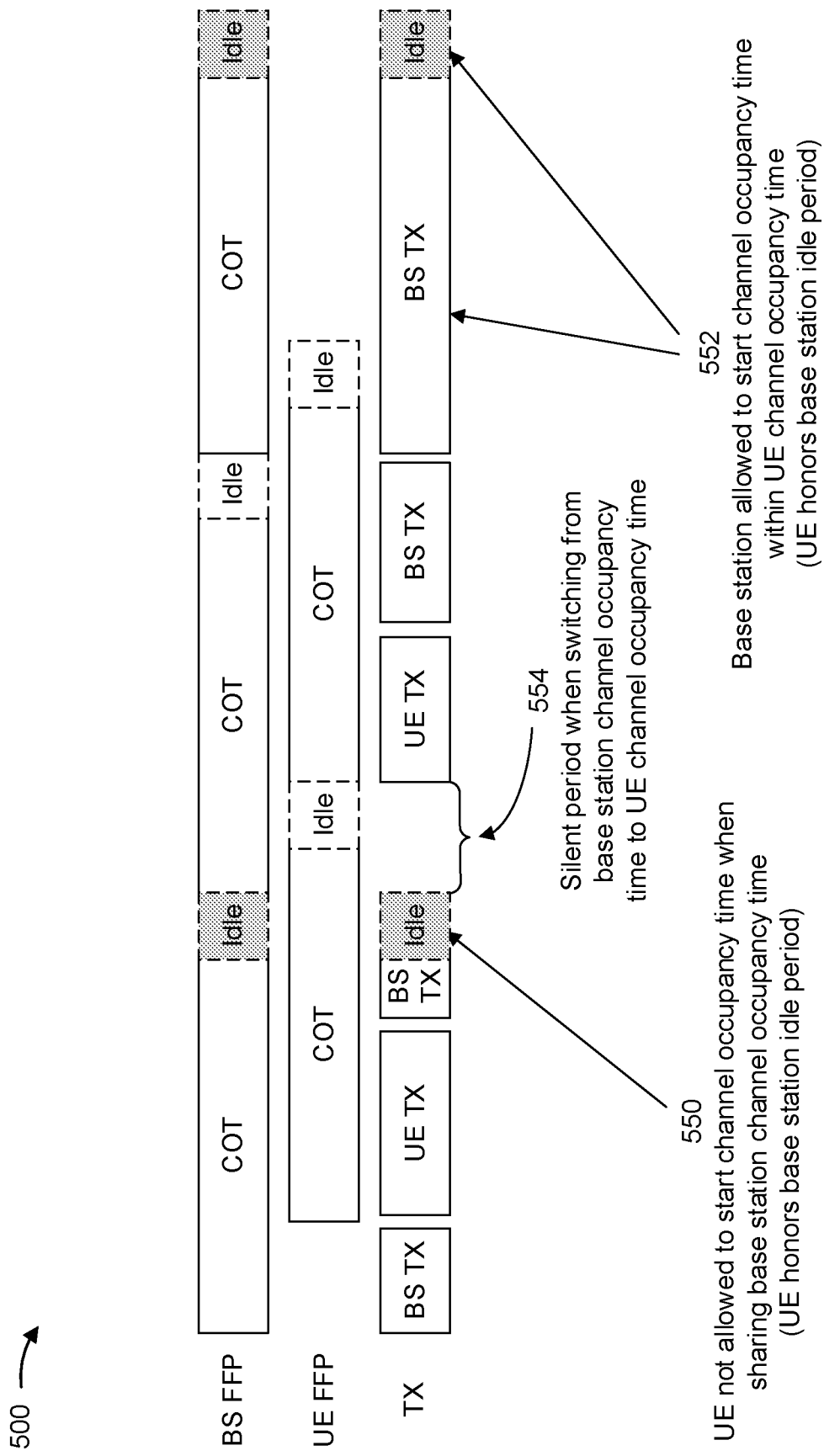

Accordingly, as shown in FIG. 5F, and by reference number 550, a UE is not allowed to start a channel occupancy time when sharing a channel occupancy time started by a base station, in which case the UE may honor the idle period in the base station FFP. However, as shown by reference number 552, the base station may be allowed to start a channel occupancy time within a channel occupancy time started by the UE. Accordingly, the idle period in the base station FFP may always be idle whenever the base station successfully acquires a channel occupancy time, and the base station may be permitted to transmit during the idle period in the UE FFP. Furthermore, as shown by reference number 554, a silent period may exist when switching from a channel occupancy time started by the base station to a channel occupancy time started by the UE. In this way, the silent period between the channel occupancy time started by the base station and the channel occupancy time started by the UE may provide an additional time when neither device is transmitting to compensate the loss of the idle period in the UE FFP due to the base station being permitted to transmit during the idle period in the UE FFP. In this way, other devices may have an opportunity to attempt an LBT procedure to access the unlicensed channel.

As indicated above, FIGS. 5A-5F are provided as examples. Other examples may differ from what is described with regard to FIGS. 5A-5F.

Figure 6:
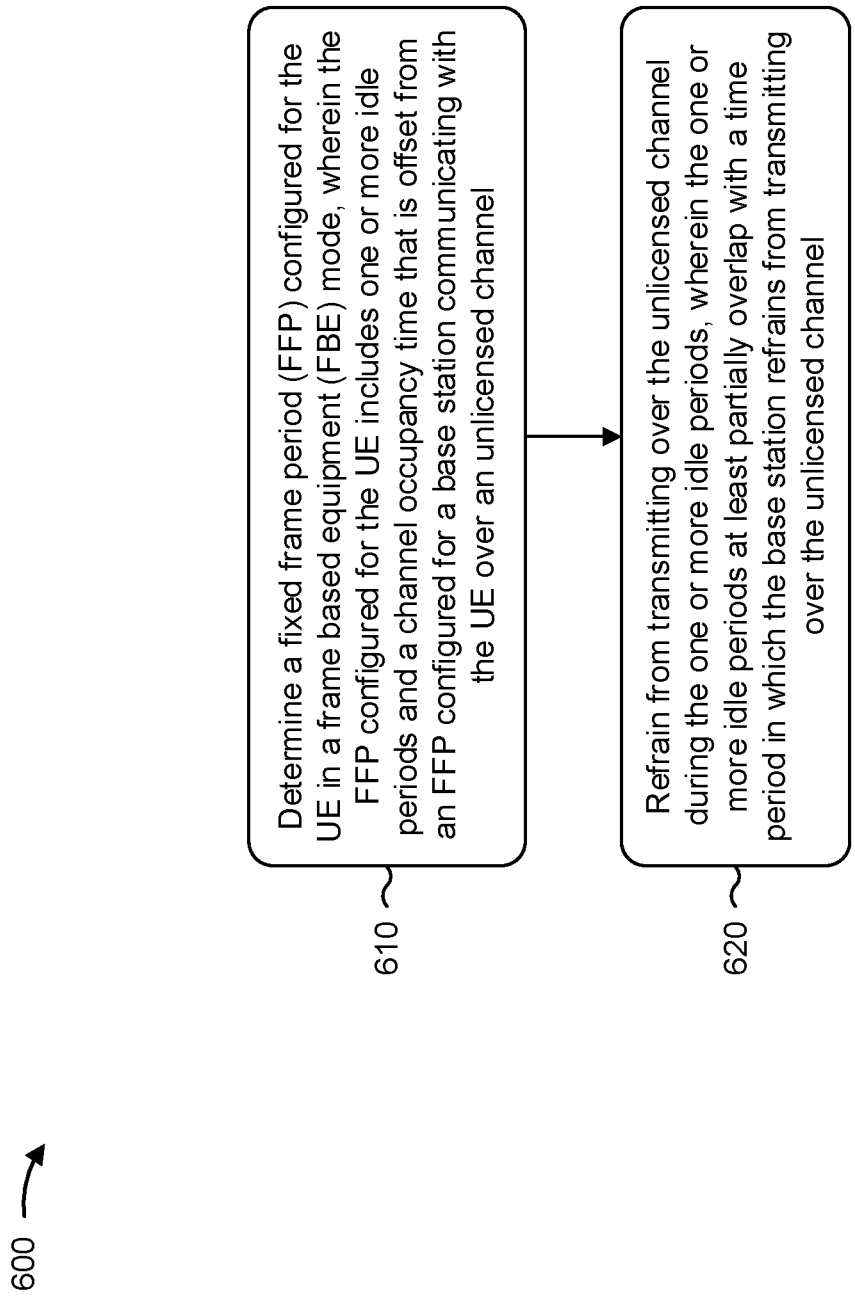
FIG. 6 is a diagram illustrating an example process associated with providing a UE FFP for FBE mode in unlicensed spectrum, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with a UE FFP for FBE mode in unlicensed spectrum.

As shown in FIG. 6, in some aspects, process 600 may include determining an FFP configured for the UE in an FBE mode, wherein the FFP configured for the UE includes one or more idle periods and a channel occupancy time that is offset from an FFP configured for a base station communicating with the UE over an unlicensed channel (block 610). For example, the UE may determine (e.g., using controller/processor 280, memory 282, and/or the like) an FFP configured for the UE in an FBE mode, wherein the FFP configured for the UE includes one or more idle periods and a channel occupancy time that is offset from an FFP configured for a base station communicating with the UE over an unlicensed channel, as described above.

As further shown in FIG. 6, in some aspects, process 600 may include refraining from transmitting over the unlicensed channel during the one or more idle periods, wherein the one or more idle periods at least partially overlap with a time period in which the base station refrains from transmitting over the unlicensed channel (block 620). For example, the UE may refrain from transmitting (e.g., using controller/processor 280, transmit processor 264, TX MIMO processor 266, MOD 254, antenna 252, memory 282, and/or the like) over the unlicensed channel during the one or more idle periods, wherein the one or more idle periods at least partially overlap with a time period in which the base station refrains from transmitting over the unlicensed channel, as described above.

Process 600 may include additional aspects, such as any single aspect or any combination of aspects described below and/or in connection with one or more other processes described elsewhere herein.

In a first aspect, the one or more idle periods include a first idle period at an end of the FFP configured for the UE and a second idle period configured by the base station.

In a second aspect, alone or in combination with the first aspect, the second idle period is aligned across multiple UEs communicating with the base station over the unlicensed channel.

In a third aspect, alone or in combination with one or more of the first and second aspects, the second idle period is aligned with an idle period in the FFP configured for the base station.

In a fourth aspect, alone or in combination with one or more of the first through third aspects, the second idle period has a different start time or a different end time than an idle period in the FFP configured for the base station.

In a fifth aspect, alone or in combination with one or more of the first through fourth aspects, refraining from transmitting over the unlicensed channel during the one or more idle periods includes refraining from transmitting during the second idle period based at least in part on a determination that a downlink signal from the base station is not detected during a channel occupancy time in the FFP configured for the base station, or refraining from transmitting during the idle period in the FFP configured for the base station based at least in part on detecting a downlink signal from the base station during the channel occupancy time in the FFP configured for the base station.

In a sixth aspect, alone or in combination with one or more of the first through fifth aspects, the UE refrains from transmitting during only the first idle period at the end of the FFP configured for the UE, based at least in part on a determination that a downlink signal from the base station is not detected during a channel occupancy time in the FFP configured for the base station.

In a seventh aspect, alone or in combination with one or more of the first through sixth aspects, the one or more idle periods include a single idle period having a start time aligned with a start time of the idle period in the FFP configured for the base station and an end time aligned with an end of the FFP configured for the UE.

In an eighth aspect, alone or in combination with one or more of the first through seventh aspects, process 600 includes initiating an LBT procedure to start the channel occupancy time in the FFP configured for the UE.

In a ninth aspect, alone or in combination with one or more of the first through eighth aspects, the LBT procedure is initiated based at least in part on a determination that a downlink signal from the base station is not detected during a channel occupancy time in the FFP configured for the base station.

In a tenth aspect, alone or in combination with one or more of the first through ninth aspects, the time period in which the base station refrains from transmitting over the unlicensed channel is aligned with an idle period at an end of the FFP configured for the UE based at least in part on the UE initiating the LBT procedure to start the channel occupancy time.

In an eleventh aspect, alone or in combination with one or more of the first through tenth aspects, the one or more idle periods in which the UE refrains from transmitting over the unlicensed channel are aligned with an idle period at an end of the FFP configured for the base station based at least in part on the base station initiating an LBT procedure to start a channel occupancy time in the FFP configured for the base station.

In a twelfth aspect, alone or in combination with one or more of the first through eleventh aspects, process 600 includes refraining from transmitting over the unlicensed channel during a silent period between a first channel occupancy time started by the UE and a second channel occupancy time started by the base station.

In a thirteenth aspect, alone or in combination with one or more of the first through twelfth aspects, the first channel occupancy time started by the UE does not overlap with the second channel occupancy time started by the base station.

In a fourteenth aspect, alone or in combination with one or more of the first through thirteenth aspects, a duration of the silent period is based at least in part on respective lengths of the FFP configured for the UE and the FFP configured for the base station.

In a fifteenth aspect, alone or in combination with one or more of the first through fourteenth aspects, the second channel occupancy time is started by the base station within the first channel occupancy time started by the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a UE, comprising: determining an FFP configured for the UE in an FBE mode, wherein the FFP configured for the UE includes one or more idle periods and a channel occupancy time that is offset from an FFP configured for a base station communicating with the UE over an unlicensed channel; and refraining from transmitting over the unlicensed channel during the one or more idle periods, wherein the one or more idle periods at least partially overlap with a time period in which the base station refrains from transmitting over the unlicensed channel.

Aspect 2: The method of Aspect 1, wherein the one or more idle periods include a first idle period at an end of the FFP configured for the UE and a second idle period configured by the base station.

Aspect 3: The method of Aspect 2, wherein the second idle period is aligned across multiple UEs communicating with the base station over the unlicensed channel.

Aspect 4: The method of Aspect 2, wherein the second idle period is aligned with an idle period in the FFP configured for the base station.

Aspect 5: The method of Aspect 2, wherein the second idle period has a different start time or a different end time than an idle period in the FFP configured for the base station.

Aspect 6: The method of Aspect 5, wherein refraining from transmitting over the unlicensed channel during the one or more idle periods includes: refraining from transmitting during the second idle period based at least in part on a determination that a downlink signal from the base station is not detected during a channel occupancy time in the FFP configured for the base station, or refraining from transmitting during the idle period in the FFP configured for the base station based at least in part on detecting a downlink signal from the base station during the channel occupancy time in the FFP configured for the base station.

Aspect 7: The method of any of Aspects 2-6, wherein the UE refrains from transmitting during only the first idle period at the end of the FFP configured for the UE, based at least in part on a determination that a downlink signal from the base station is not detected during a channel occupancy time in the FFP configured for the base station.

Aspect 8: The method of Aspect 1, wherein the one or more idle periods include a single idle period having a start time aligned with a start time of the idle period in the FFP configured for the base station and an end time aligned with an end of the FFP configured for the UE.

Aspect 9: The method of any of Aspects 1-8, further comprising: initiating an LBT procedure to start the channel occupancy time in the FFP configured for the UE.

Aspect 10: The method of Aspect 9, wherein the LBT procedure is initiated based at least in part on a determination that a downlink signal from the base station is not detected during a channel occupancy time in the FFP configured for the base station.

Aspect 11: The method of any of Aspects 9-10, wherein the time period in which the base station refrains from transmitting over the unlicensed channel is aligned with an idle period at an end of the FFP configured for the UE based at least in part on the UE initiating the LBT procedure to start the channel occupancy time.

Aspect 12: The method of any of Aspects 1-11, wherein the one or more idle periods in which the UE refrains from transmitting over the unlicensed channel are aligned with an idle period at an end of the FFP configured for the base station based at least in part on the base station initiating an LBT procedure to start a channel occupancy time in the FFP configured for the base station.

Aspect 13: The method of any of Aspects 1-12, further comprising: refraining from transmitting over the unlicensed channel during a silent period between a first channel occupancy time started by the UE and a second channel occupancy time started by the base station.

Aspect 14: The method of Aspect 13, wherein the first channel occupancy time started by the UE does not overlap with the second channel occupancy time started by the base station.

Aspect 15: The method of any of Aspects 13-14, wherein a duration of the silent period is based at least in part on respective lengths of the FFP configured for the UE and the FFP configured for the base station.

Aspect 16: The method of any of Aspects 13-15, wherein the second channel occupancy time is started by the base station within the first channel occupancy time started by the UE.

Aspect 17: An apparatus for wireless communication at a device, comprising a processor; memory coupled with the processor; and instructions stored in the memory and executable by the processor to cause the apparatus to perform the method of any of Aspects 1-16.

Aspect 18: A device for wireless communication, comprising a memory and one or more processors coupled to the memory, the memory and the one or more processors configured to perform the method of any of Aspects 1-16.

Aspect 19: An apparatus for wireless communication, comprising at least one means for performing the method of any of Aspects 1-16.

Aspect 20: A non-transitory computer-readable medium storing code for wireless communication, the code comprising instructions executable by a processor to perform the method of any of Aspects 1-16.

Aspect 21: A non-transitory computer-readable medium storing a set of instructions for wireless communication, the set of instructions comprising one or more instructions that, when executed by one or more processors of a device, cause the device to perform the method of any of Aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more processors configured to:
     determine a fixed frame period (FFP) configured for the UE in a frame based equipment (FBE) mode, wherein the FFP configured for the UE includes:
       a first idle period different than a second idle period associated with an FFP configured for a network node communicating with the UE over an unlicensed channel, and
       a channel occupancy time configured for the UE that is offset from the FFP configured for the network node,
       wherein the first idle period is at an end of the FFP configured for the UE and the second idle period is at an end of the FFP configured for network node; and refrain from transmitting over the unlicensed channel during the first idle period and based at least in part on a channel occupancy time configured for the network node.

2. The UE of claim 1, wherein the first idle period and the second idle period are each configured by the network node.

3. The UE of claim 1, wherein the one or more processors, to refrain from transmitting over the unlicensed channel during the first idle period, are configured to:
refrain from transmitting over the unlicensed channel during only the first idle period.

4. The UE of claim 1, wherein the one or more processors, to refrain from transmitting over the unlicensed channel during the first idle period, are configured to:
refrain from transmitting over the unlicensed channel during the first idle period based at least in part on a determination that a downlink signal from the network node is not detected during the channel occupancy time configured for the network node.

5. The UE of claim 1, wherein the first idle period is aligned with a third idle period configured for the network node.

6. The UE of claim 1, wherein the one or more processors are further configured to:
initiate a listen-before-talk (LBT) procedure to start the channel occupancy time configured for the UE.

7. The UE of claim 1, wherein the first idle period and the second idle period at least partially overlap.

8. The UE of claim 1, wherein, to determine the FFP configured for the UE, the one or more processors are configured to:
receive configuration information indicating the first idle period and the channel occupancy time.

9. The UE of claim 1, wherein the one or more processors are further configured to:
receive system information indicating the second idle period.

10. The UE of claim 1, wherein a start of the first idle period is aligned with a start of the second idle period.

11. The UE of claim 1, wherein the one or more processors are further configured to:
receive an indication of the channel occupancy time for the network node.

12. A method of wireless communication performed by a user equipment (UE), comprising:
determining a fixed frame period (FFP) configured for the UE in a frame based equipment (FBE) mode, wherein the FFP configured for the UE includes:
a first idle period, different than a second idle period associated with an FFP configured for a network node communicating with the UE over an unlicensed channel, and
a channel occupancy time configured for the UE that is offset from the FFP configured for the network node, wherein the first idle period is at an end of the FFP configured for the UE and the second idle period is at an end of the FFP configured for the network node; and
refraining from transmitting over the unlicensed channel during the first idle period and based at least in part on a channel occupancy time configured for the network node.

13. The method of claim 12, wherein the first idle period and the second idle period are each configured by the network node.

14. The method of claim 12, wherein refraining from transmitting over the unlicensed channel during the first idle period comprises:
refraining from transmitting over the unlicensed channel during only the first idle period.

15. The method of claim 12, wherein refraining from transmitting over the unlicensed channel during the first idle period comprises:
refraining from transmitting over the unlicensed channel during the first idle period based at least in part on a determination that a downlink signal from the network node is not detected during the channel occupancy time configured for the network node.

16. The method of claim 12, wherein the first idle period is aligned across multiple UEs communicating with the network node over the unlicensed channel.

17. The method of claim 12, wherein the first idle period is aligned with a third idle period configured for the network node.

18. The method of claim 12, further comprising:
initiating a listen-before-talk (LBT) procedure to start the channel occupancy time configured for the UE.

19. The method of claim 12, further comprising:
receiving an indication of the channel occupancy time for the network node.

20. A non-transitory computer-readable medium storing a set of instructions for wireless communication, the set of instructions comprising:
one or more instructions that, when executed by one or more processors of a user equipment (UE), cause the UE to:
determine a fixed frame period (FFP) configured for the UE in a frame based equipment (FBE) mode, wherein the FFP configured for the UE includes:
a first idle period, different than a second idle period associated with an FFP configured for a network node communicating with the UE over an unlicensed channel, and
a channel occupancy time configured for the UE that is offset from the FFP configured for the network node,
wherein the first idle period is at an end of the FFP configured for the UE and the second idle period is at an end of the FFP configured for network node; and
refrain from transmitting over the unlicensed channel during the second idle period and based at least in part on a channel occupancy time configured for the network node.

21. The non-transitory computer-readable medium of claim 20, wherein the first idle period and the second idle period are each configured by the network node.

22. The non-transitory computer-readable medium of claim 20, wherein the one or more instructions, that cause the UE to refrain from transmitting over the unlicensed channel during the first idle period, cause the UE to:
refrain from transmitting over the unlicensed channel during only the first idle period.

23. The non-transitory computer-readable medium of claim 20, wherein the one or more instructions, that cause the UE to refrain from transmitting over the unlicensed channel during the first idle period, cause the UE to:
refrain from transmitting over the unlicensed channel during the first idle period based at least in part on a determination that a downlink signal from the network node is not detected during the channel occupancy time configured for the network node.

24. The non-transitory computer-readable medium of claim 20, wherein the first idle period is aligned with a third idle period configured for the network node.

25. The non-transitory computer-readable medium of claim 20, wherein the one or more instructions further cause the UE to:
   initiate a listen-before-talk (LBT) procedure to start the channel occupancy time configured for the UE.

26. An apparatus for wireless communication, comprising:
   means for determining a fixed frame period (FFP) configured for the apparatus in a frame based equipment (FBE) mode, wherein the FFP configured for the apparatus includes:
      a first idle period, different than a second idle period associated with an FFP configured for a network node communicating with the apparatus over an unlicensed channel, and
      a channel occupancy time configured for the apparatus that is offset from the FFP configured for the network node,
         wherein the first idle period is at an end of the FFP configured for the apparatus and the second idle period is at an end of the FFP configured for the network node; and
   means for refraining from transmitting over the unlicensed channel during the first idle period and based at least in part on a channel occupancy time configured for the network node.

27. The apparatus of claim 26, wherein the first idle period and the second idle period are each configured by the network node.

28. The apparatus of claim 26, wherein the means for refraining from transmitting over the unlicensed channel during the second idle period comprises:
   means for refraining from transmitting over the unlicensed channel during only the first idle period.

29. The apparatus of claim 26, wherein the means for refraining from transmitting over the unlicensed channel during the first idle period comprises:
   means for refraining from transmitting over the unlicensed channel during the first idle period based at least in part on a determination that a downlink signal from the network node is not detected during the channel occupancy time configured for the network node.

* * * * *